Aug. 28, 1962 W. A. WEST 3,051,076
METHOD AND APPARATUS FOR COMPRESSING COTTON
Filed Sept. 8, 1961 2 Sheets-Sheet 1
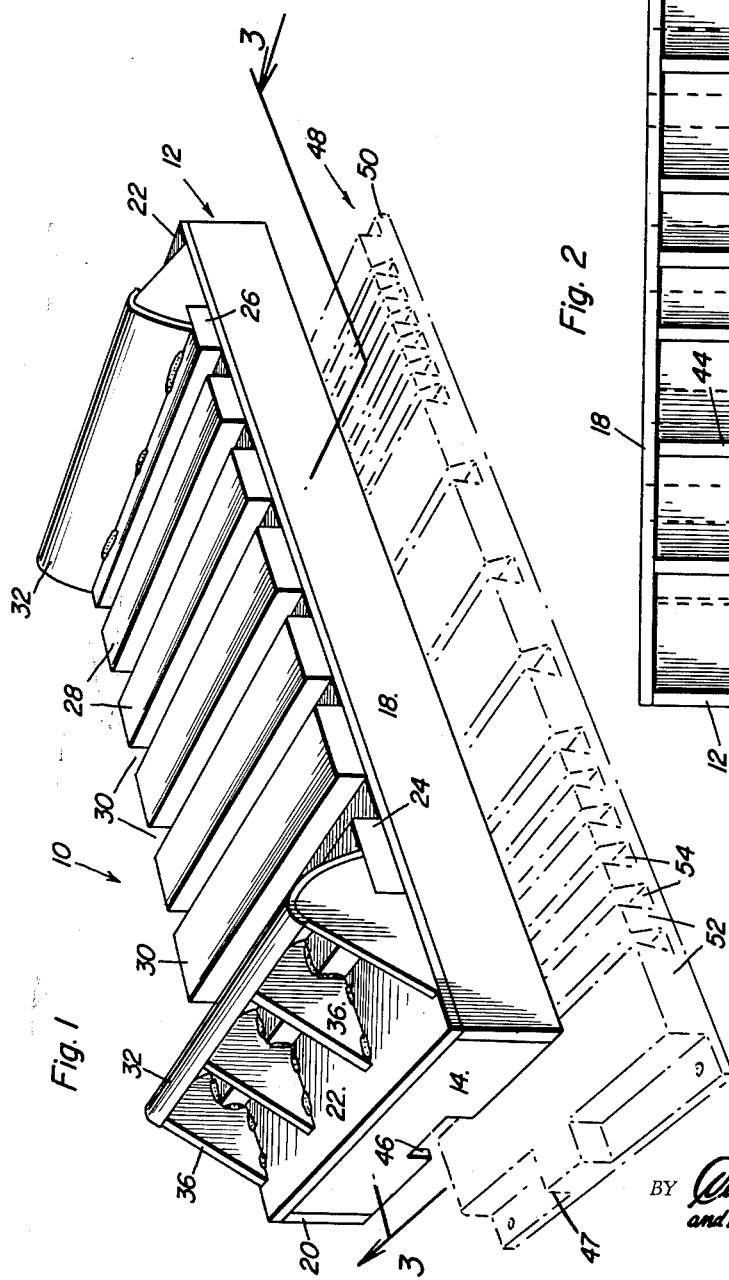
William A. West
INVENTOR.

Aug. 28, 1962    W. A. WEST    3,051,076
METHOD AND APPARATUS FOR COMPRESSING COTTON
Filed Sept. 8, 1961    2 Sheets-Sheet 2
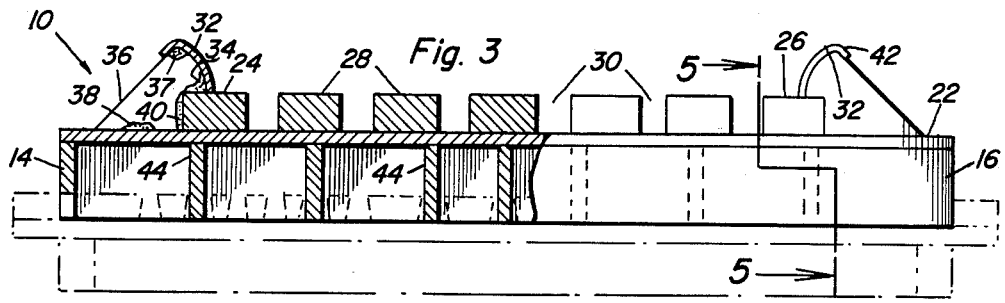
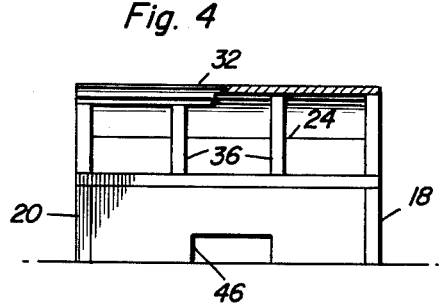
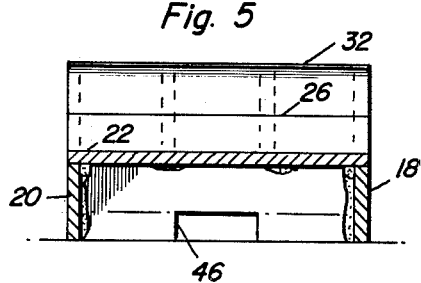
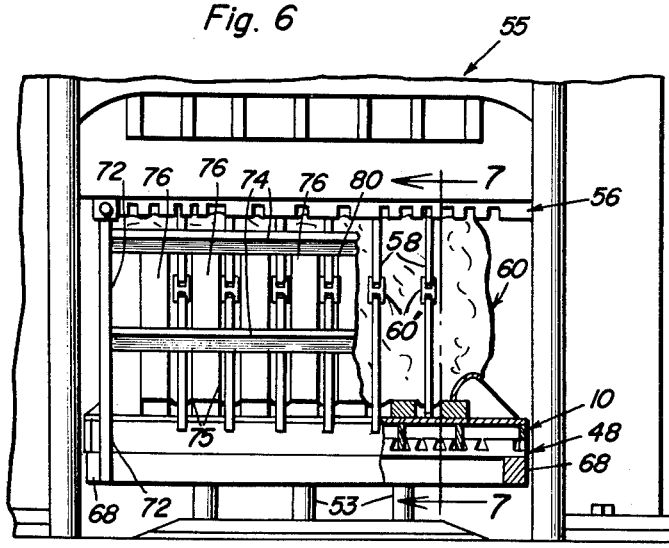
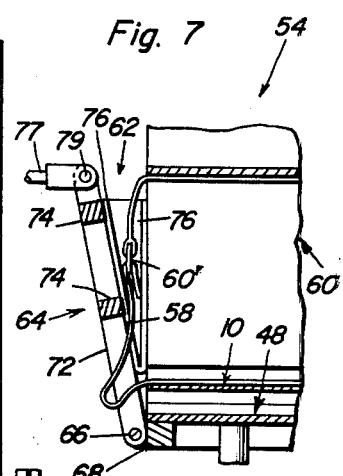
William A. West
INVENTOR.

3,051,076
METHOD AND APPARATUS FOR
COMPRESSING COTTON
William A. West, P.O. Box 3678, Phoenix, Ariz.
Filed Sept. 8, 1961, Ser. No. 136,894
9 Claims. (Cl. 100—3)

This invention relates to compressing machinery, and particularly to a device for re-compressing bales of cotton into smaller standard bales.

It is a primary object of this invention to provide a new and novel method and apparatus for compressing flat bales of cotton into smaller and more dense bales.

It is another object of the invention to provide a new method and apparatus for further compressing bales of cotton into smaller bales whereby it is not necessary to remove the bands from the original bale, and these bands are merely re-adjusted so as to remove the slack therefrom for holding the re-compressed bale in its highly compressed condition. This is accomplished by providing a platen of novel design for compressing the original bale which is provided with a plurality of grooves so arranged that the grooves lie adjacent the bands on the bale when it is placed on the platen and the bands buckle into the grooves during the pressing operation. After the bale is further compressed, the slack is then merely taken up in the bands for securing it in its more compressed form.

It is still another object of the invention to provide a method and apparatus for compressing flat bales of cotton wherein a novel designed platen is provided on the lower portion of the press, but no change is required in the upper platen.

It is still another object of the invention to provide a method and apparatus for compressing bales of cotton that does not necessarily require the use of side doors, but if this should be desirable, a cage is provided to slip over the present side doors, or be attached thereto, and this cage has protruding spaced bars matching the grooves of the lower platen to enable the bands to expand and belly out into the spaced bars when the bale is being compressed.

It is another object of the invention to provide a novel method and apparatus for compressing bales of cotton into more dense bales whereby the use of a Dinky Press and the necessity of removing the bands is eliminated thereby making unnecessary a band table and operating crew, and also eliminating the need for re-welding or splicing of bands on the re-compressed bale. It is anticipated by this method and apparatus that a flat bale of cotton can be compressed to standard density with a crew of twelve men, as compared to forty men now required on existing methods and apparatus for compressing flat bales.

It is another object of my invention to provide a novel platen for further compressing flat gin bales of cotton which is so designed that it may slip over the present lower platen now used on high density cotton compresses, particularly the Webb 80" or Webb 90" compress.

The present method of compressing cotton to either standard or high density compression is accomplished by the following steps:

(1) Insertion of the bale as it comes from the gin into what is commonly known as a Dinky Press to remove the six bands from the bale.

(2) The bale is then held together by the application of wire hooks on the ends of the bale to the bagging thereby holding the bale sufficiently tight to transport by hand-truck to the Webb 80" or Webb 90" press.

(3) The bale is then pressed to the desired density and either eight or nine bands are inserted through the grooves of the top platen and returned to the grooves of a lower platen and then tied up by means of a wire and steel buckle.

(4) The six bands removed from the gin bale are cut to the desired length for tying up the bale in the Webb 80" or Webb 90" compress and the short remaining pieces are then welded, riveted or spliced to make a band of the desired length for use in the Webb 80" or Webb 90" compress.

It is another object of the invention to provide a method and apparatus for entirely eliminating the above steps 1, 2 and 4.

Briefly, in using my invention, the flat gin bale is inserted directly into the Webb 80" or Webb 90" compress with the six bands still intact thereon. The bands on the bale are matched with the grooves in my platen which is mounted on the lower portion of the compress on the high density platen. When the flat gin bale is compressed, the bands on the bale move into the channels in my platen and the bands further belly out on each side of the bale during compression. When the bale has been pressed to the desired density, the slack in the bands is then tightened up by the buckle on each band and tied out to the original buckle remaining on each band, and the excess lengths of the bands are triple lapped and folded between the bands and the bale so as to eliminate the cutting of excess length of the bands, thus retaining the original weight of the bagging and bands as applied at the gin.

Another advantage of my invention is that it differs from standard compressing of bales as only six bands are used to hold a standard bale after compressing it instead of the usual eight bands, and these six bands are the same ones that were on the original flat gin bale. In reusing these bands, it is not necessary to weld or rivet them to form bands of different lengths.

It is still another object of my invention to provide a new and novel platen for further compressing flat gin bales of cotton which is relatively simple in design, economical to manufacture, light in weight, of rigid construction, and long lasting in use thereby requiring a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a perspective view showing my novel platen and how it fits over a lower standard platen;

FIGURE 2 is a bottom view on a reduced scale of the platen shown in solid lines in FIGURE 1 with parts broken away;

FIGURE 3 is a side elevational view partially in section of the platens shown in FIGURE 1 connected together;

FIGURE 4 is an end elevational view, partially in section of the device shown in FIGURE 3;

FIGURE 5 is a vertical cross-sectional view taken substantially on the plane of the line 5—5 in FIGURE 3;

FIGURE 6 is a side elevational view on a reduced scale illustrating my novel platen in use in compressing a gin bale in a Webb 80" or 90" compress; and FIGURE 7 is a cross-sectional view on the plane of line 7—7 of FIGURE 6 with parts broken away.

Referring to the drawings, it can be seen that my novel platen 10 includes a hollow, rectangular and box-like base 12. Base 12 comprises two vertically extending parallel end walls 14 and 16 welded at their ends to the ends of a front wall 18 and a rear wall 20. These walls are covered and welded to a base plate 22.

Secured to the upper surface of the base plate 22 are two end bars 24 and 26 and five intermediate bars 28. All the bars are rectangular in cross-section and extend across the narrow portion of the base plate 22 so as to be parallel to each other and to the ends of the plate. The bars are all equally spaced so as to provide six band receiving grooves or recesses 30. The bars 28 are preferably of all equal size; however, the end bars 24 and 26 are preferably slightly larger than the intermediate bars because of the excess stress imposed thereon.

Bale positioning shoes 32 are secured to the upper surface of the end bars 24 and 26 by means of welds 34. The shoes are reinforced by a plurality of parallel longitudinally extending substantially triangular reinforcing ribs 36. The ribs are preferably equally spaced, are composed of plate material and are secured to the base plate, the end bars and the positioning shoes by means of welds 36, 38 and 40. The inwardly facing upper ends of the ribs 36 are arcuate so as to conform to the shape of the shoes 32. The shoes 32 curve or flare outwardly from each other about an arc formed substantially on a center of the outer apex of the triangular ribs. The upper ends of the shoes are flanged over the top surface of the ribs as shown at 42.

The central and intermediate portions of the plate 22 are reinforced by a plurality of laterally extending girders or partitions 44 which extend between the insides of the front and rear walls 20 and 18, and their ends are welded thereto. The spacing between two girders is irregular for reasons explained below.

All the parts of the platen 10 are preferably composed of cold rolled steel plate and are secured together by arc welds.

The end walls 14 and 16 are provided with rectangular notches 46 in the center of their bottom edges so as to receive lugs 47 on platen 48.

FIGURE 1 illustrates the platen 10 being inserted on a high density lower platen 48 for a Webb 80" or Webb 90" compress. The platent 48 is of conventional design and comprises a base plate 50 with a plurality of spaced bars 52 secured to its upper surface and spaced so as to form a plurality of band-receiving grooves 54.

FIGURE 6 illustrates the standard lower high density platen 48 mounted in a conventional manner on the bed plate 68 of a standard Webb 80" or Webb 90" compress 55. This compress also includes a fixed top platen 56 which is substantially identical to the platen 48. As explained above, when the standard compress 55 is used in the conventional manner, the original six bands 58 of the gin bale 60 are removed, and a gin bale 60 held together by special bale compressing hooks is inserted into the compress between the platens 56 and 48. A new set of bands, comprising at least eight in number are inserted into the grooves of platens 48 and 56 and the bale 60 is compressed by the platens as the steam actuated bed plate 68 moves upwardly towards the fixed platen 56. The eight or more bands in the grooves 54 are then tightened to retain the bale in its compressed position. This conventional manner of using compress 55 is not illustrated in the drawings.

In using my novel platen 10, the platen is inserted downwardly over the platen 48 illustrated in FIGURES 1 and 3 so that the front and rear walls 18 and 20 extend over the ends of all the bars 52, and the end walls 14 and 16 fit snugly over the ends or outer edges of the two end bars 52 on the platen 48. The joists 44 are so located that they extend into some of the recesses 54 and abut against the upper surface of the base plate 50 of the platen 48.

After the platen 10 is secured on the platen 48, the flat gin bale 60 is then mounted on its edge on top of the platen 10 and below the platen 56 so that the ends of the bale are fitted between the shoes 32, and the original bands 58 of the bale lie directly above the recesses 30 as shown in FIGURE 6.

After the bale is placed in position on the platen 10, the steam actuated linkage 53 of the Webb 80" or 90" machine moves the bed plate upwardly, thereby pushing the platens 10 and 48 and the bale 60 upwardly toward the fixed platen 56. It is to be noted that all or most of the bands 58 do not align with the recesses in the upper platen 56, thereby clamping the bands in place between the upper platen and bale. As the platen 10 is pushed upwardly, the bale 60 is compressed between the platens. As the bale compresses, the bands 58 extend into the recesses 30. My invention includes the provision of rib cages 62 applied to the conventional side door and/or rolling bale attachment 64 for the press 55. These rib cages, at 62 in FIGURE 7, also have recesses or spaces 75 between their bars similar to the recesses or grooves 30 for receiving the bands 58 when the bale is compressed. After the bale is properly compressed in the press 55, the original bands 58 are tightened by means of the conventional buckles 60'.

It is to be noted that the shoes 32 retain the bale 60 in proper position during the pressing operation, and also prevent outer bulging of the ends of the bale when it is further compressed. FIGURE 7 illustrates how a rib cage 62 may be applied to the conventional side door and/or rolling bale attachment 64 of the press 55. The side door and/or rolling bale attachment 64 is pivotally hinged at its bottom and comprises horizontal frame members 74 secured at their ends to legs 72 which are pivoted at 66 to bed plate 68.

The rib cage 62 comprises a plurality of triangularly shaped I-beams 76 extending vertically and in the same plane as the side of the flat bale 60, and spaced from one another so as to form band receiving recesses 75 which are in alignment with the grooves 30 in the platen 10. The beams 76 are secured to frame members 74 of side doors 64 and preferably overlap the side edges of platens 56 and 10. The doors 64 and I-beams 76 are pressed against the bale by operator links 77 pivoted at 79 to the doors. The use of the side door and/or rolling bale attachment 64 and rib cage is optional. However, these devices are desirable since they prevent outward bulging of the bale 60 during further compression thereof.

The recesses 46 in the end walls 14 and 16 may extend over lugs or projections 47 provided on some of the standard platens 48, and also serve as gripping surfaces or handles for lifting the platen 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In a press for compressing gin bales of cotton, each bale surrounded by a predetermined number of spaced bands and the press having an upper fixed platen and a lower power operated platen, both platens having a plurality of transverse recesses spaced closer together than said bands, the improvement comprising a third platen supported on one of the upper and lower platens, said third platen including a base having a plurality of transverse upwardly facing grooves therein, the number of said grooves being equal to or greater than said predetermined number, said grooves being wider than and spaced the same as said bands whereby the bands will buckle into said grooves when the bale is compressed between one of said first mentioned platens and said third platen.

2. In a press for compressing gin bales of cotton, each bale surrounded by a predetermined number of spaced bands and the press having an upper fixed platen and a lower power operated platen, both platens having a plurality of transverse recesses spaced closer together than said bands, the improvement comprising a third platen supported on one of the upper and lower platens, said third platen including a base having a plurality of transverse grooves therein, the number of said grooves being equal to or greater than said predetermined number, said grooves being wider than and spaced the same as said bands whereby the bands will buckle into said grooves when the bale is compressed between one of said first mentioned platens and said third platen, a vertically extending rib cage pivotally mounted on each side of said third platen and extending upwardly toward the upper platen, said rib cage being provided with other grooves in alignment with said first mentioned grooves.

3. In a press for compressing gin bales of cotton, each bale surrounded by a predetermined number of spaced bands and the press having an upper fixed platen and a lower power operated platen, both platens having a plurality of transverse recesses spaced closer together than said bands, the improvement comprising a third platen supported on the upper surface of the lower platen, said third platen including a base having a plurality of transverse upwardly facing grooves therein, the number of said grooves being at least as great as said predetermined number, said grooves being wider than and spaced the same as said bands whereby the bands will buckle into said grooves when the bale is compressed between the upper and third platens, a bale positioning shoe mounted on each end of said base and extending parallel to said grooves, each shoe curving upwardly and away from the other.

4. In a press for compressing gin bales of cotton, each bale surrounded by a predetermined number of spaced bands and the press having an upper fixed platen and a lower power operated platen, both platens having a plurality of transverse recesses spaced closer together than said bands, the improvement comprising a third platen supported on the upper surface of the lower platen, said third platen including a base having a plurality of transverse upwardly facing grooves therein, the number of said grooves being at least as great as said predetermined number, said grooves being wider than and spaced the same as said bands whereby the bands will buckle into said grooves when the bale is compressed between the upper and third platens, said third platen base comprising a plate supported on a box-like hollow structure, said structure being divided by a plurality of transverse partitions spaced the same as and adapted to extend into the recesses of the lower platen when the third platen is telescoped over and supported on the lower platen, a bale positioning shoe mounted on each end of said plate and extending parallel to said grooves, each shoe curving upwardly and away from the other.

5. In a press for compressing gin bales of cotton, each bale surrounded by a predetermined number of spaced bands and the press having an upper fixed platen and a lower power operated platen, both platens having a plurality of transverse recesses spaced closer together than said bands, the improvement comprising a third platen supported on the upper surface of the lower platen, said third platen including a base having a plurality of transverse upwardly facing grooves therein, the number of said grooves being at least as great as said predetermined number, said grooves being wider than and spaced the same as said bands whereby the bands will buckle into said grooves when the bale is compressed between the upper and third platens, said third platen base comprising a plate supported on a box-like hollow structure, said structure being divided by a plurality of transverse partitions spaced the same as and adapted to extend into the recesses of the lower platen when the third platen is telescoped over and supported on the lower platen, a bale positioning shoe mounted on each end of said plate, each shoe curving upwardly and away from the other, a vertically extending rib cage pivotally mounted on each side of said third platen and extending upwardly toward the upper platen, said rib cage being provided with other grooves in alignment with said first mentioned grooves.

6. An improved method for compressing gin bales having a fixed number of bands thereon in a compress having upper and lower platens adapted to use a greater number of bands than said fixed number, comprising the steps of providing a third platen having grooves wider than and spaced the same as said bands and the number of said grooves equal to said fixed number, supporting said third platen on the lower platen of said compress with the grooves facing upwardly, placing said bale on said third platen with its bands directly over said grooves, urging said third platen upwardly so as to compress said bale between said third platen and the upper platen of the compress and force said bands into said grooves, tightening said bands while said bale is compressed between the platens.

7. An improved method for compressing gin bales having a predetermine number of spaced bands thereon in a compress having a pair of opposing platens with slots therein spaced at different distances than said bands, the method comprising the steps of providing a third platen having grooves wider than and spaced the same as said bands and the number of said grooves being at least as great as said predetermined number, supporting said third platen on one of the compress platens with the grooves facing the other compress platen, placing said bale between said third and other platen with the bands directly in alignment with said grooves, urging said compress platens together so as to compress said bale between said third and other platen of the compress and force said bands into said grooves, tightening said bands on said bale while it is compressed between the platens.

8. In combination, a press for compressing gin bales of cotton surrounded by a predetermined number of spaced bands, the press having an upper fixed platen and a lower power operated platen, both platens having a plurality of transverse recesses spaced closer together than said bands, a third platen supported on one of the upper and lower platens, said third platen including a base having a plurality of transverse grooves therein, the number of said grooves being at least as great as said predetermined number, said grooves being wider than and spaced the same as said bands whereby the bands will buckle into said grooves when the bale is compressed between the other press platen and said third platen.

9. The combination of claim 8 wherein the side of said third platen adjacent the one platen is provided with a plurality of transverse ribs spaced the same as and extending into the recesses of said one platen, said ribs contacting the bottoms of said recesses and thereby strengthening said third platen.

References Cited in the file of this patent

UNITED STATES PATENTS

| 130,320 | Shriver | Aug. 6, 1872 |
| 1,009,258 | Phelps | Nov. 21, 1911 |

FOREIGN PATENTS

| 398,144 | Great Britain | Sept. 7, 1933 |